United States Patent [19]
Sapper et al.

[11] 3,823,969
[45] July 16, 1974

[54] PNEUMATIC SHOCK ABSORBING BUMPER

[75] Inventors: Richard Sapper, Stuttgart, Germany; Sergio Marocco, Milan, Italy

[73] Assignee: Fiat Societe per Azioni and Industrie Pirelli S.p.A., Milan, Italy

[22] Filed: Oct. 20, 1972

[21] Appl. No.: 299,573

[30] Foreign Application Priority Data
Oct. 25, 1971  Italy................................. 70490/71

[52] U.S. Cl..................... 293/71 P, 188/1 C, 293/1
[51] Int. Cl..... B60r 19/10, B60r 21/02, B61f 19/04
[58] Field of Search............ 293/1, 2, 71 P; 188/1 C

[56]  References Cited
UNITED STATES PATENTS

| | | | |
|---|---|---|---|
| 2,120,459 | 6/1938 | Brown............................... | 293/2 X |
| 2,731,290 | 1/1956 | Corydon........................ | 293/71 P X |
| 3,284,122 | 11/1966 | Rich................................... | 293/1 |
| 3,362,742 | 1/1968 | Sanderson............................. | 293/1 |
| 3,512,822 | 5/1970 | Rich et al. ............................ | 293/1 |
| 3,666,310 | 5/1972 | Burgess et al..................... | 293/71 R |
| 3,690,710 | 9/1972 | Curran.............................. | 293/71 R |

*Primary Examiner*—M. Henson Wood, Jr.
*Assistant Examiner*—Howard Beltran
*Attorney, Agent, or Firm*—Sughrue, Rothwell, Mion, Zinn & Macpeak

[57]  ABSTRACT

This invention provides a pneumatic collision guard for vehicles of the type comprising a flexible walled hollow body of inextensible material containing air under pressure. The hollow body has air discharge apertures which are normally closed but which are opened rapidly, for example by the breaking of brittle caps over the apertures when as a consequence of a collision, the deceleration of the vehicle or the deformation of the air filled body, reaches a given value corresponding to the maximum acceptable deceleration, thereby limiting the reaction force imparted to the vehicle through the collision guard.

5 Claims, 6 Drawing Figures

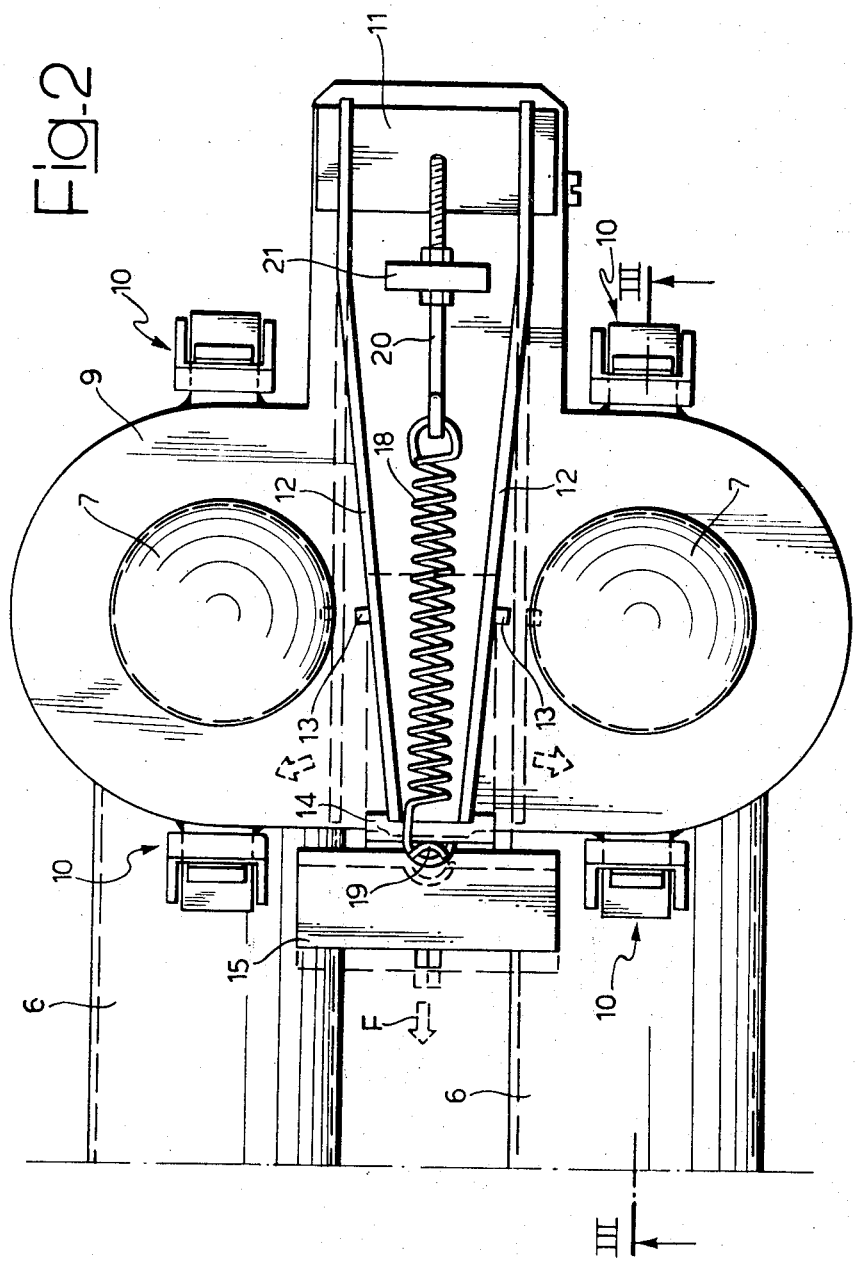

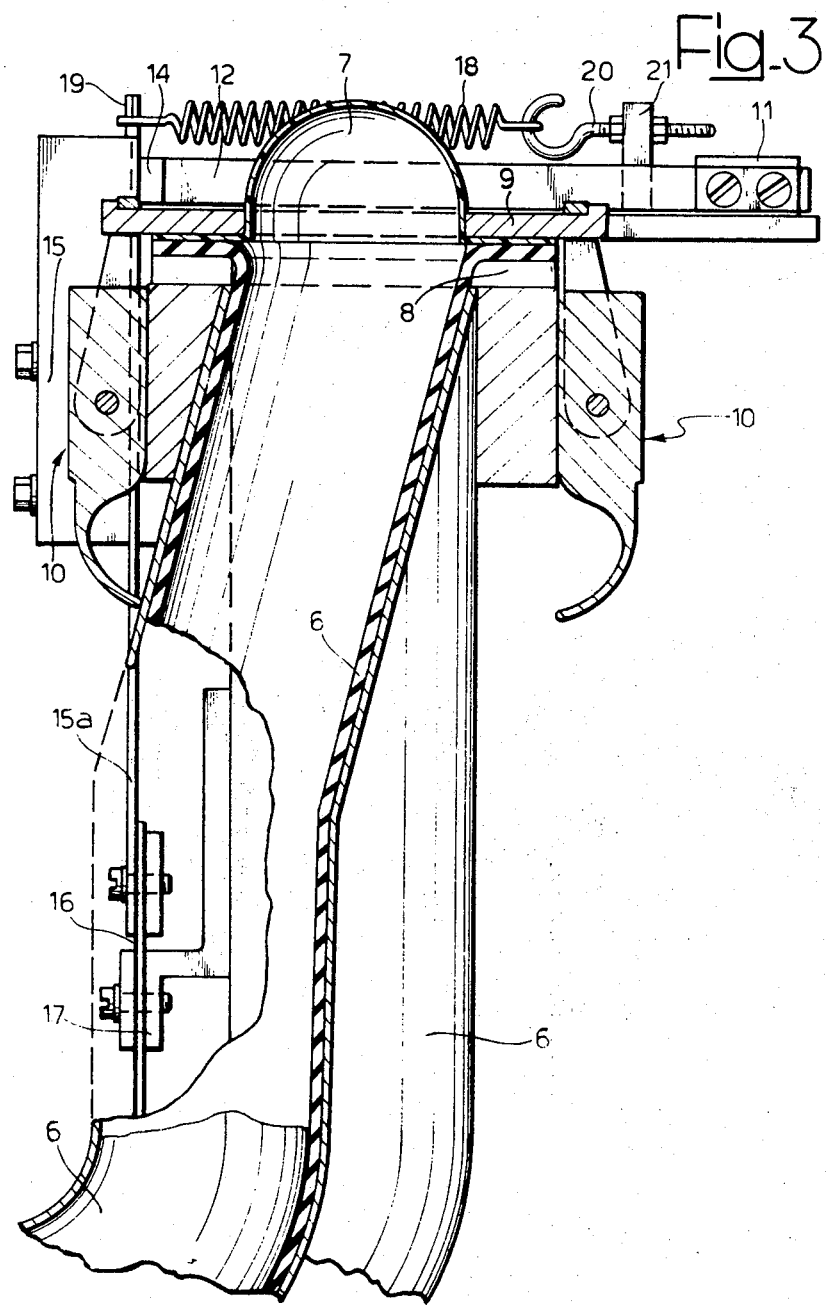

PNEUMATIC SHOCK ABSORBING BUMPER

BACKGROUND OF THE INVENTION

The present invention relates to collision guards for motor vehicles, of the type comprising a flexible-walled and non extensible body containing air under pressure, adapted to absorb the kinetic energy of the vehicle in the event of frontal collisions of limited intensity.

In particular the invention relates to a collision guard of the abovementioned pneumatic type capable of absorbing the kinetic energy of collisions occuring at speeds between 6.2137 and 12.4264 mi/hour (10 and 20 km/hour) without imparting to the body of the vehicle a deceleration greater than the maximum deceleration calculated to be capable of being withstood by the vehicle body without resulting in any appreciable permanent deformation.

From a first elementary calculation it may be deduced that for a vehicle body in the form of a perfectly closed cylinder to be capable of absorbing the kinetic energy of a frontal collision without imparting to the vehicle a deceleration greater than the aforesaid maximum, such body must be of very large dimensions and in particular of a diameter incompatible with the admissible bulk for the vehicle body.

OBJECTS OF THE INVENTION

It is the object of the present invention to obviate these disadvantages and to provide a collision guard of the pneumatic type which satisfies the abovementioned requirements and the overall dimensions of which fall within tolerable limits.

SUMMARY OF THE INVENTION

According to the present invention there is provided a collision guard for motor vehicles, of the type constituted by a flexible-walled hollow body of inextensible material containing air under pressure, characterised in that the hollow body is provided with at least one aperture for air discharge, each aperture being normally closed, and in that means are provided to cause rapid opening of said aperture or apertures when a given parameter, which is affected by deformation of the hollow body, attains a particular value upon the occurence of a collision with the guard.

According to a preferred method of actuation the given parameter which controls the opening of the air discharge aperture or apertures is the acceleration of the vehicle and the magnitude of the acceleration at which opening of the aperture or apertures takes place, is chosen to be such that at no instant successive to the opening is the maximum acceptable acceleration exceeded, without permanent deformations occuring. Instantaneous automatic opening of the air discharge aperture(s) in response to such acceleration causes gradual discharge to atmosphere of the high pressure which otherwise would build up in the hollow body in the event of a collision, due to the diminution of its internal volume. Consequently the elastic reaction exerted on the vehicle by the collision guard is limited and the acceleration imparted to the vehicle is kept below an acceptable maximum.

Throughout the present Specification and Claims the term "acceleration" is intended to comprehend both acceleration imposed on the vehicle in the event of a collision against its rear fender by a following vehicle, and deceleration of the vehicle deriving from a frontal collision.

BRIEF DESCRIPTION OF THE DRAWINGS

The invention will be further described, by way of non-limiting example, with reference to the accompanying drawings, in which:

FIG. 2 is a plan view on an enlarged scale compared with FIG. 1, showing the arrangement for control of the instantaneous opening of the air discharge apertures.

FIG. 3 is a transverse cross-section on line III—III of FIG. 2;

DETAILED DESCRIPTION OF THE ILLUSTRATED EMBODIMENTS

Figure 1:
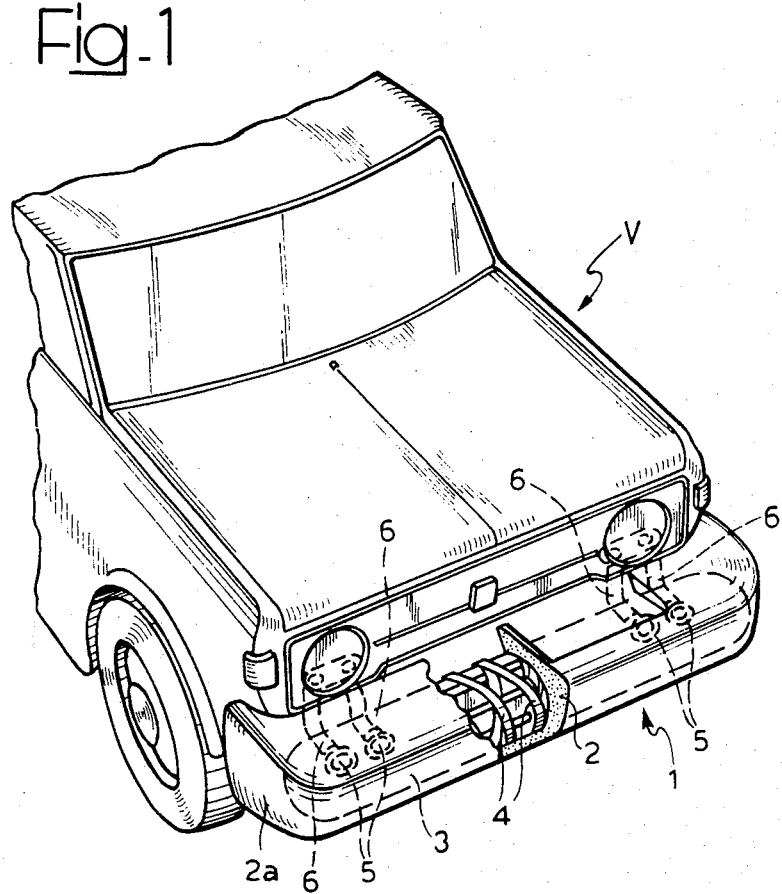
FIG. 1 is a diagrammatic view in perspective partially cut away, of a pneumatic collision guard or fender according to one embodiment of this invention, mounted on the front of a motor vehicle.

With reference to FIG. 1, a pneumatic fender or collision guard 1 according to the invention is shown fitted to the front of the body V of a vehicle. The collision guard 1 comprises a flexible - walled non extensible hollow body 3 filled with air under under pressure and incorporated in a casing 2 of yieldable material, such as for example cellular polyurethane. The casing 2 is connected externally to the body V.

The purpose of the yieldable casing 2 is to protect the hollow body 3 from direct collisions against sharp pointed objects or corners and to afford a soft bumper or fender with a cushioning effect in collisions with people, such as pedestrians, cyclists or other road users. The casing 2 is itself protected by an external skin 2a having a high degree of surface finish, good resistance to abrasion and good stability when exposed to atmospheric chemical agents and sudden changes of temperature.

The hollow body 3 is constituted, in the example illustrated, by a cylinder of elastomeric material, closed at its two ends by hemispherical covers and reinforced by an outer layer constituted in the example of FIG. 1 by strips of fabric or cord 4.

The hollow body 3 is provided at its rear with several discharge apertures 5 which communicate with respective tubes 6 (broken outlines in FIG. 1) each of which has a right-angled bend and each of which has an outlet end remote from the body located within the interior of the hood of the vehicle V.

As shown in particular in FIGS. 2 and 3 the outlet end of each tube 6 is normally closed by a hemispherical cap 7 made of brittle material. In the example shown, the tubes 6 are arranged in pairs and the mouths of each pair of juxtaposed tubes 6 are closed by two hemispherical caps 7 having flanges clamped between a baseplate 8 and a removable plate 9 which is held in position on the baseplate 8 by means of releasable toggle fasteners 10.

The pressure plate 9 has a central part 11 (FIG. 2) to which are anchored symmetrically two spring strips 12 provided with laterally projecting percussion elements 13 facing towards the respective brittle caps 7. The free ends of the two spring strips 12 are rectilinear in shape and are engaged with elastic deformation of the strips, against shoulders provided in a retaining plate 14 attached to body 15 constituting the inertial mass of an accelerometer.

The accelerometer body 15 has a downwardly projecting plate 15a (FIG. 3) connected to a fixed bracket 17 of the vehicle body through a flexible strip 16 which acts as a ligament hinge. The accelerometer body 15 is normally retained in a retracted position of repose shown in FIG. 2 and 3 by a calibrated spring 18, one end of which is hooked to a projection 19 fixed to the accelerometer body 15 and the opposite end of which is hooked to an adjustable draw-rod 20 carried by a bracket 21 attached to the pressure plate 9.

The arrangement described above with reference to FIGS. 1 to 3 functions as follows: it will be supposed that the direction of movement of the vehicle V is that indicated by the broken arrow F in FIG. 2. When the vehicle suffers a frontal collision it is subjected to a deceleration, that is, a rearward acceleration: when this deceleration attains a predetermined value, for example of the order of 10 g, forward displacement of the body 15 against the action of the spring 18 is sufficient to release the ends of the two laminated spring strips 14 from the retaining plate 14. The two spring strips 12 when released move apart laterally and their respective percussion elements 13 strike the brittle caps 7, causing them to shatter. The two discharge apertures 5 are thus both fully opened, virtually instantaneously.

Figure 4:
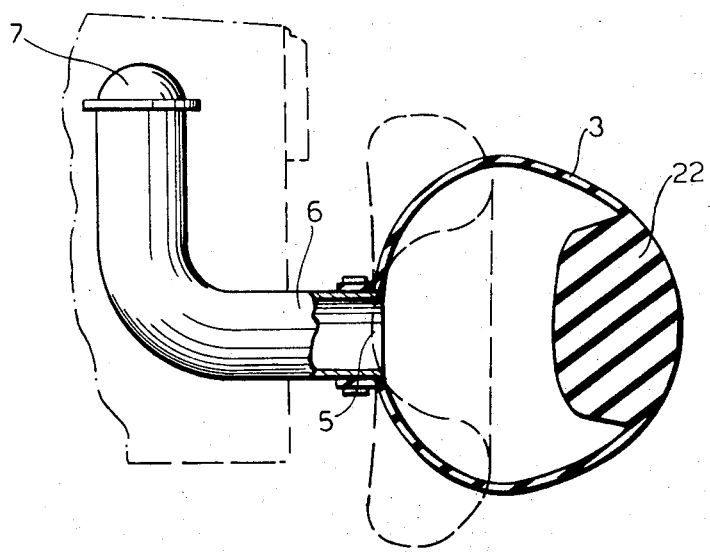
FIG. 4 is a diagrammatic transverse section of a collision guard according to a variant of the embodiment of FIG. 1.

In the variant shown in FIG. 4 the pneumatic body 3 carries on its interior, in positions diametrically opposed to the air discharge apertures 5 for the escape of air, plugs 22 of extremely deformable material, the task of which is to close the discharge apertures 5 before complete collapse of the body 3 has occured; in this manner the residual air trapped in the body 3 by the plugs 22 has a resilient buffering effect.

In the variant shown in FIG. 5 the effective size of the escape aperture 5 of the flexible walled body 3 is determined by deformation of the pneumatic body itself rather than by the deceleration of the vehicle as described with reference to FIGS. 2 and 3.

Figure 5:
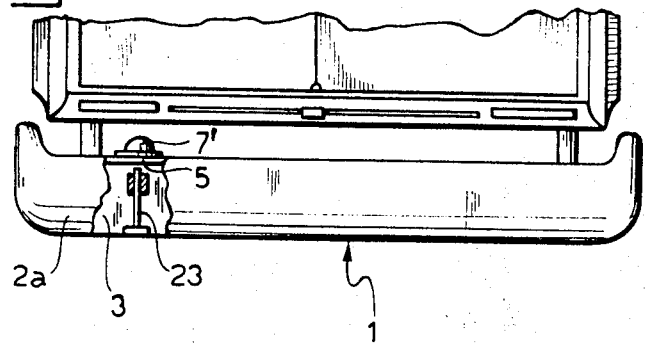
FIG. 5 is a diagrammatic plan view, partially sectioned, of a pneumatic collision guard according to a further variant of the embodiment of FIG. 1.

In the variant of FIG. 5 the brittle caps 7 are mounted directly over the escape apertures 5 and their fracture is caused by striker rods 23 fitted to the inside face of the pneumatic body 3 directly opposite the rods 23. The movement of the rods 23 between their normal or repose positions and their rearward positions in which they strike against the caps 7 is calculated to be such that fracture of the caps occurs when the body 3 has been subjected to deformation corresponding to the maximum admissible deceleration.

Figure 6:
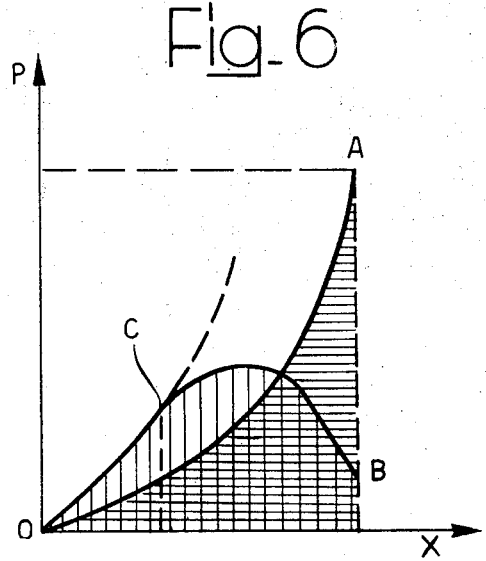
FIG. 6 is a diagram illustrating graphically the variation of the deformation of the guard with load thereon.

The advantage of the collision guard according to this invention is illustrated graphically in FIG. 6 in which the abscissa represents deformation X of the hollow body, and the ordinate represents the magnitudes of the forces P acting on said body. For a given maximum deformation, and given a certain value of the energy absorbed, the curve O A shows the behaviour of a pneumatic collision guard without any air escape apertures, while the curve O C B indicates the behaviour of a pneumatic collision guard according to this invention, that is a hollow body which when subjected to a collision causes a high initial internal pressure, which pressure causes controlled release of air through discharge apertures when the pressure reaches a given magnitude, represented by the point C. The area under each curve is a measure of the energy absorbed during the deformation, and is about equal in the two illustrated cases. The maximum resilient reaction force is, however, substantially less for the collision guard of the present invention than for the closed pneumatic guard, as illustrated by the curve O C B.

A further advantage of the collision guard according to this invention lies in the fact that it does not completely recover after a collision has occured. As a result of the discharge of air from the pneumatic body, any subsequent elastic reaction when the guard is next deformed follows course different from the curve O C B, with a lower peak force. Thus the rebound force after a collision is automatically reduced.

That is to say, the collision guard according to this invention acts not only as a limiter of the reaction force withstood by guard in the event of a collision, but also acts as a shock absorber.

It will be appreciated that details of practical embodiments of this invention and their manner of operation may be varied widely with respect to those illustrated embodiments herein described, without thereby departing from the scope of this invention.

What is claimed is:

1. A collision guard for motor vehicles comprising:
   a. a flexible-walled hollow body of inextensible material containing air pressure therein, said body having at least one aperature through the wall to allow the air therein to be discharged,
   b. a brittle cap normally closing said aperature, and
   c. means for causing rapid opening of said aperture having an inertial mass relatively movable with respect to said motor vehicle, a calibrated spring acting on said inertial mass in opposition to the force caused by the deceleration of the vehicle, an elastic element carrying a percussion element having one end releasably engaged with the inertial mass such that when the deceleration force overcomes the calibrated spring force, the inertial mass moves releasing the elastic element and causes the percussion element to strike and break the brittle cap.

2. The collision guard defined in claim 1, including a plug of deformable material provided within said hollow body in a position directly opposite the respective air discharge aperature, said plug being adapted to close said aperture when the hollow body deforms under collision forces, before complete crushing of the said body has occured.

3. The collision guard defined in claim 1 wherein said hollow body has a protective casing of soft material.

4. The collision guard defined in claim 3, wherein the protective casing comprises a matrix of cellular plastics material and a flexible skin covering said matrix.

5. The collision guard defined in claim 1, wherein said hollow body comprises a tubular core of elastomeric material and an outer layer of reinforcement material.

* * * * *